United States Patent
Kogan et al.

(10) Patent No.: US 7,562,361 B2
(45) Date of Patent: Jul. 14, 2009

(54) THREAD-BASED LIMITATION ON COMPUTER APPLICATION

(75) Inventors: Daniel Kogan, Issaquah, WA (US); Robin Smith, Bothell, WA (US); Chris White, Redmond, WA (US); Michal Piaseczny, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 818 days.

(21) Appl. No.: 10/787,797

(22) Filed: Feb. 26, 2004

(65) Prior Publication Data

US 2005/0198637 A1 Sep. 8, 2005

(51) Int. Cl.
*G06F 9/46* (2006.01)
(52) U.S. Cl. .................................. 718/100
(58) Field of Classification Search ............ 718/100
See application file for complete search history.

(56) References Cited

U.S. PATENT DOCUMENTS

| | | | | |
|---|---|---|---|---|
| 5,325,526 | A * | 6/1994 | Cameron et al. | 718/102 |
| 5,379,426 | A * | 1/1995 | Foss et al. | 719/315 |
| 6,092,154 | A * | 7/2000 | Curtis et al. | 711/137 |
| 2002/0165912 | A1* | 11/2002 | Wenocur et al. | 709/203 |
| 2003/0101085 | A1* | 5/2003 | Butler et al. | 705/9 |

OTHER PUBLICATIONS

Alex, R.M. et al, "Cooperative Multi-Thread Parallel Tabu Search with an Application to Circuit Partitioning", *Solving Irregularly Structured Problems in Parallel. 5th International Symposium, Irregular*, 1998, 310-331.

Brinkschulte, U. et al., "A Multithreaded Java Microcontroller for Thread-Orients Real-Time Event-Handling", *International Conference on Parallel Architectures and Compilation Techniques*, 1999, 34-39.

Zahran, M. et al., "Dynamic Thread Resizing for Speculative Multithreaded Processors", *Proceedings 21st International Conference on Computer Design*, 2003, 313-318.

* cited by examiner

*Primary Examiner*—Meng-Ai An
*Assistant Examiner*—Mengyao Zhe
(74) *Attorney, Agent, or Firm*—Woodcock Washburn LLP

(57) ABSTRACT

A computing device includes an operating system that manages an application and maintains threads relating thereto, where each thread has assigned attributes and the operating system executes each thread according to each attribute thereof. An interface process of the application receives a thread with a request for the application, sets an attribute of the request/thread to enforce a limitation within the application, and forwards the request/thread to the application for further processing in accordance with the limitation to produce a result. The interface process thereafter receives the same thread with the result from the application, resets the attribute of the result/thread to remove the limitation outside of the application, and forwards the result/thread for delivery to the requester. Thus, the interface process ensures by way of setting and resetting the attribute on the thread that the limitation on the application is satisfied.

20 Claims, 3 Drawing Sheets

THREAD-BASED LIMITATION ON COMPUTER APPLICATION

TECHNICAL FIELD

The present invention relates to an application running on a computer system whereby a particular use of the application is limited by placing a restriction on a thread associated with the application. More particularly, the present invention relates to such an application whereby the use of the application is limited to one or more particular processors by restricting the thread to being executed by such one or more processors.

BACKGROUND OF THE INVENTION

In at least some circumstances, it may be deemed advisable and or necessary to restrict how a computer application executes on a computing device. For example, it may be that an application is distributed in a partially functioning version such as a trial version or a standard version and a fully functioning version such as a retail version or a professional version, where the partially functioning version is less expensive to acquire, but correspondingly does not contain all the features and capabilities of the fully functioning version. Similarly, it may be that an application as distributed should not be employed on a computer with an older operating system, or that a less expensive version of the application can only be used with an older operating system and a more expensive version of the application can be used with an older and a newer operating system. As may be seen, then, restrictions applied to the use of a computer application can be based on functional limitations incumbent in the application, marketing and/or distribution considerations, and the like.

In one specific instance, it may be the case that the application is a server application that can be employed on a computing device with one or more processors. Obviously, the server application will function more quickly and/or efficiently on a computing device with more processors as compared to a computing device with less processors, all other things being equal. In connection with such server application, then, it may be decided by the distributor and/or manufacturer thereof that, based on market considerations, it would be advisable to sell a 'full' version of the server application that can use all available processors on a computing device, and also to sell a 'limited' version of the server application that can only use one or some of the available processors on the computing device. Likely, the full version would be employed by a relatively more heavy-duty user and thus would have a relatively high price, while the limited version would be employed by a relatively less heavy-duty user and thus would have a relatively low price. Such an arrangement is typical, especially where the application is attempting to satisfy both a low-end and a high-end of a market.

The distributor/manufacturer might attempt to enforce the processor limitation on the limited version of the application by way of an end user license agreement or other equivalent extraction of a promise from the user. Of course, such a promise is easily made and easily broken, and therefore has no real and effective enforcement mechanism.

Accordingly, the distributor/manufacturer might in addition or in the alternative attempt to enforce the processor limitation on the limited version of the application by restricting the application from being installed on a computing device with more than a maximum number of processors. Implementing such a restriction is known or should be apparent to the relevant public and therefore need not be set forth herein in any detail. However, and significantly, implementing such a restriction is not advisable, especially inasmuch as such a restriction is unduly harsh in that such restriction may unnecessarily require the user to purchase an additional computing device solely to satisfy the restriction. Similarly, it may be the case that a user only has a computing device with more than the maximum number of processors. At any rate, such a restriction can be overcome by installing more processors after installing the application, and therefore is not very effective against a nefarious entity intent on beating same.

Accordingly, in the case where a particular use of a computer application is to be restricted on a computing device, a need exists for a method and mechanism that imposes such restriction in a reasonable manner without being unduly harsh. More particularly, a need exists for a method and mechanism that imposes such restriction by way of restricting a thread executing on the computing device and corresponding to the application. Even more particularly, a need exists for a method and mechanism that restricts use of the application to one or more particular processors on the computing device. Such method and mechanism would allow a distributor/manufacturer of an application to enforce the restriction even on a computing device that otherwise fails to satisfy such restriction.

SUMMARY OF THE INVENTION

The aforementioned needs are satisfied at least in part by the present invention in which a method and mechanism are provided for enforcing a limitation on an application operating on a computing device. The computing device includes an operating system thereon that manages the application and that maintains a number of threads relating to the application, where each thread has a number of attributes assigned thereto by the operating system, and where the operating system executes each thread according to each attribute thereof.

An interface process of the application receives a thread with a request for the application from a requester, sets an attribute of the request/thread with the operating system to enforce such limitation within the application, and forwards the request/thread to the application for further processing in accordance with the limitation to produce a result. The interface process thereafter receives the same thread with the result from the application, resets the attribute of the result/thread with the operating system to remove the limitation outside of the application, and forwards the result/thread for further processing and delivery to the requestor. Thus, the interface process ensures by way of setting and resetting the attribute on the thread that the limitation on the application is satisfied.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
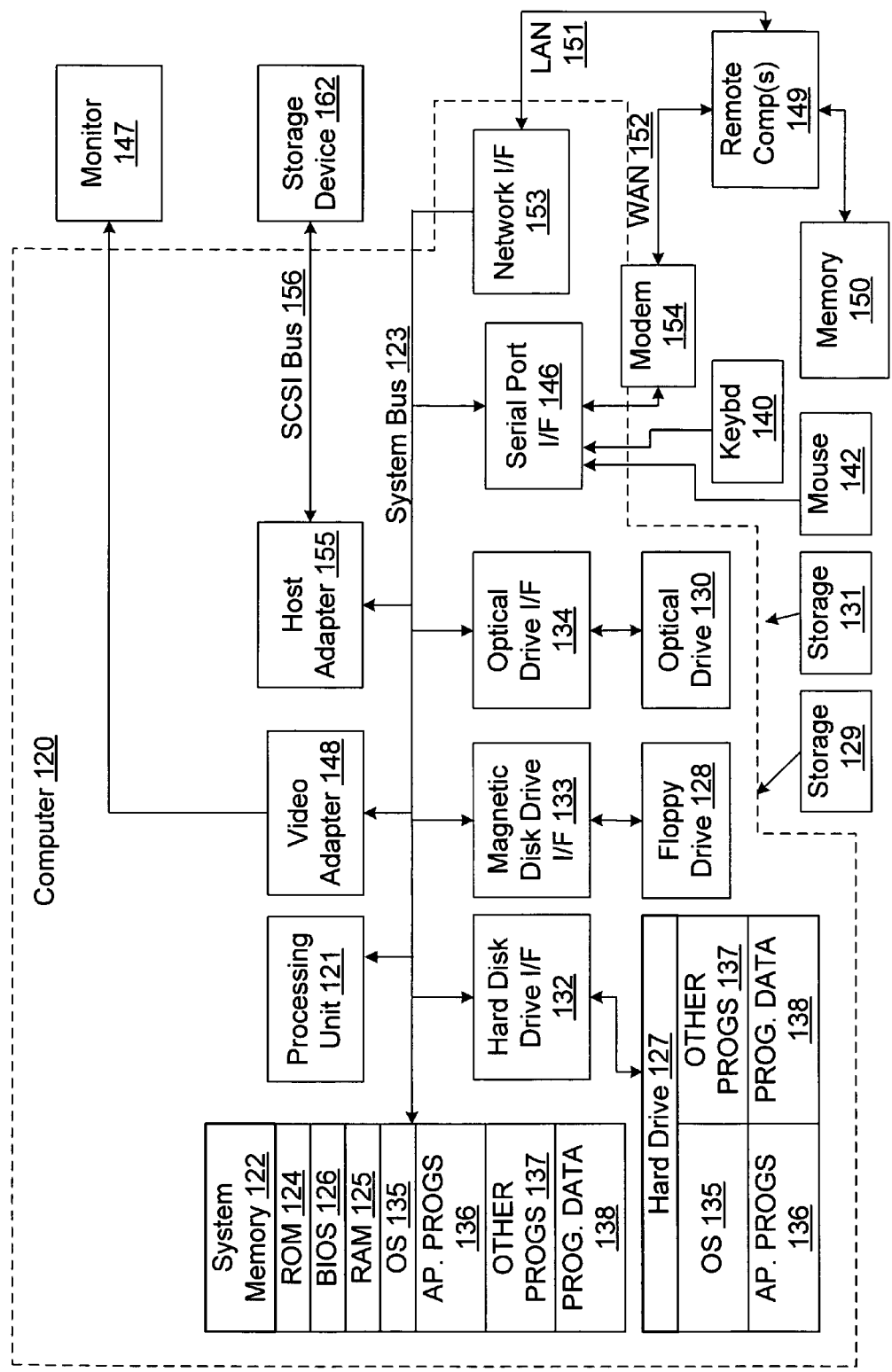
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Thread-Based Restriction

Figure 2:
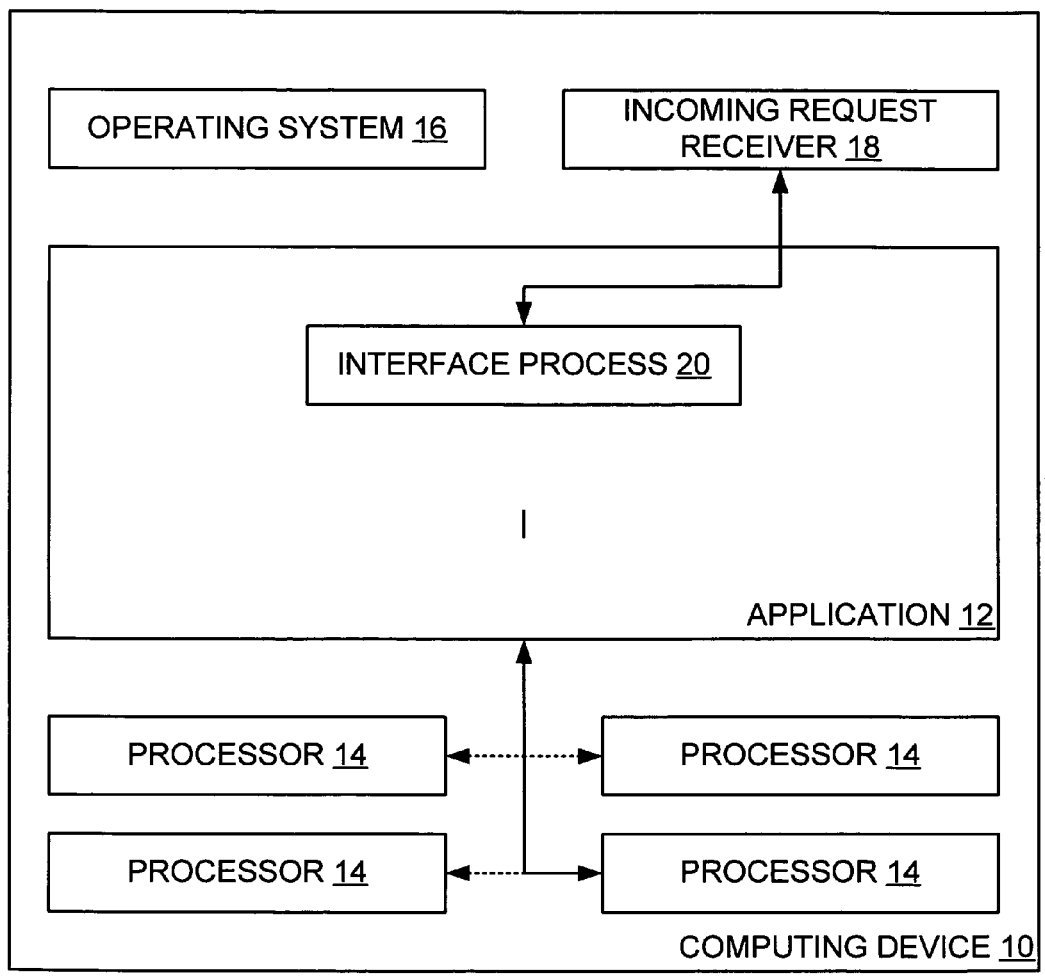
FIG. 2 is a block diagram showing a computing device including an application and an interface process thereof in accordance with one embodiment of the present invention.

Turning now to FIG. 2, it is seen that the present invention is practiced in connection with a computing device 10 having an application 12 running thereon, where the application 12 may be a limited version having restricted functionality, as opposed to a full version having full functionality. Such application 12 may be any appropriate application without departing from the spirit and scope of the present invention, and the functionality thereof that is restricted may likewise be any functionality without departing from the spirit and scope of the present invention. In one embodiment of the present invention, in fact, the application 12 serves information from the computing device 10 based on an internally or externally received request, and the functionality that is restricted is the number of processors 14 on the computing device 10 that may be employed by the application 12.

As may be appreciated, and as is typical, the computing device 10 includes an operating system 16 thereon that manages applications running on such computing device 10, including the application 12. Also typically, the operating system 16 maintains one or more processes or 'threads' relating to each running application, including the application 12, where each thread represents current activity with respect to the corresponding application or a portion thereof, and where each thread may have certain attributes assigned thereto by the operating system 16. Examples of such attributes are known or should be apparent to the relevant public and therefore need not be set forth herein in any detail, although it is to be appreciated that such attributes for a thread are primarily employed to set priority for the thread, define restrictions on the thread, define access rights for the thread, and the like.

Significantly, the operating system 16 in executing a thread employs such attributes in a manner such that the operating system 16 does not violate restrictions imposed by such attributes. Thus, if a particular thread attribute specifies particular memory to be used in connection with the thread thereof, the operating system 16 ensures that such thread in fact uses such particular memory. Likewise, and relevant to the present invention, if a particular thread attribute specifies that a particular processor 14 be employed in connection with the thread thereof, the operating system 16 ensures that such thread in fact uses such particular processor 14.

Typically, the computing device 10 includes an incoming request receiver 18, either as part of or independent of the operating system 16, where the incoming request receiver 18 receives requests for applications including the application 12 at issue, determines from each received request an application on the computing device 10 to which the request should be forwarded, such as the application 12, and then in fact forwards the received request to the determined application by way of a thread thereof as maintained by the operating system 16 of the computing device 10. Such an incoming request receiver 18 and the operation thereof is known or should be apparent to the relevant public and therefore need not be set forth herein in any detail.

Also typically, the incoming request receiver 18 upon receiving a request for the application 12 at issue forwards the received request to the application 12 by way of a thread thereof that leads to an interface process 20 of the application 12. As should be appreciated, the interface process 20 initially receives the request on behalf of the application 12, determines therefrom where the request/thread is to be directed for further processing, and in fact directs the request/thread to some portion of the application 12 for such further processing. In addition, upon the request/thread being processed by the application 12 to produce a result to be returned to the requester, the interface process 20 receives such result by way of the same thread as the corresponding request, determines therefrom where the result/thread is to be directed for further processing external to the application 12, and in fact directs the result/thread to such external location for such further processing. As may be appreciated, the general functionality of such an interface process 20 and the operation thereof is known or should be apparent to the relevant public and therefore need not be set forth herein in any detail. More specific functionality of such an interface process 20 in accordance with one embodiment of the present invention is set forth below.

As was set forth above, a distributor, manufacturer, or the like may wish to enforce a limitation on the limited version of the application 12, such as for example that the limited application 12 can only be employed with one processor 14 on the computing device 10 or a subset of processors 14 on the computing device 10, where the computing device 10 includes multiple such processors 14. Of course, such distributor, manufacturer, or the like may in addition or in the alternative wish to enforce other limitations on the limited version of the application 12 without departing from the spirit and scope of the present invention. For example, such other limitations include but are not limited to certain ports, certain memory addresses, certain memory devices, certain files, certain peripherals, and the like.

At any rate, to enforce such a processor limitation or other limitation, and in one embodiment of the present invention, the interface process 20 as part of receiving the aforementioned 'incoming' thread with the aforementioned request sets an attribute of the incoming thread to enforce such limitation 'within' the limited application 12. For example, with regard to a processor limitation, the interface process 20 sets a processor attribute of the incoming thread to identify one or more specific processors 14 on which the thread is to be run while the thread is within the limited application 12. In addition, the interface process 20 as part of receiving the aforementioned 'outgoing' thread with the aforementioned response resets the processor attribute of the outgoing thread to remove such limitation outside of the limited application 12. For example, and again with regard to the processor limitation, the interface process 20 resets the processor attribute of the outgoing thread to whatever pre-existing value was present prior to being set to identify the aforementioned specific processors 14. As may be appreciated, to do so, the interface process 20 should store such pre-existing value prior to setting the processor attribute so that such pre-existing value may be retrieved and re-applied when resetting such processor attribute.

Note that in enforcing a limitation by setting an attribute of a thread, the interface process 20 should not violate any pre-existing limitations on the thread as set elsewhere. For example, if the thread already has a pre-existing limitation to a particular processor 14, the interface process 20 should not set the processor attribute in a manner contrary to such pre-existing limitation. Instead, the interface process 20 should gracefully fail the request.

Thus, the interface process 20 ensures by way of setting and resetting attributes on the thread that the restrictions on the limited application 12 are satisfied. Note that setting and resetting attributes on a thread is known or should be apparent to the relevant public and therefore need not be set forth herein in any detail. Accordingly, any appropriate method or mechanism may be employed to set and reset attributes on the thread without departing from the spirit and scope of the present invention. For example, the interface process 20 may set and reset attributes on the thread by way of appropriate calls to the operating system 16 of the computing device 10.

Figure 3:
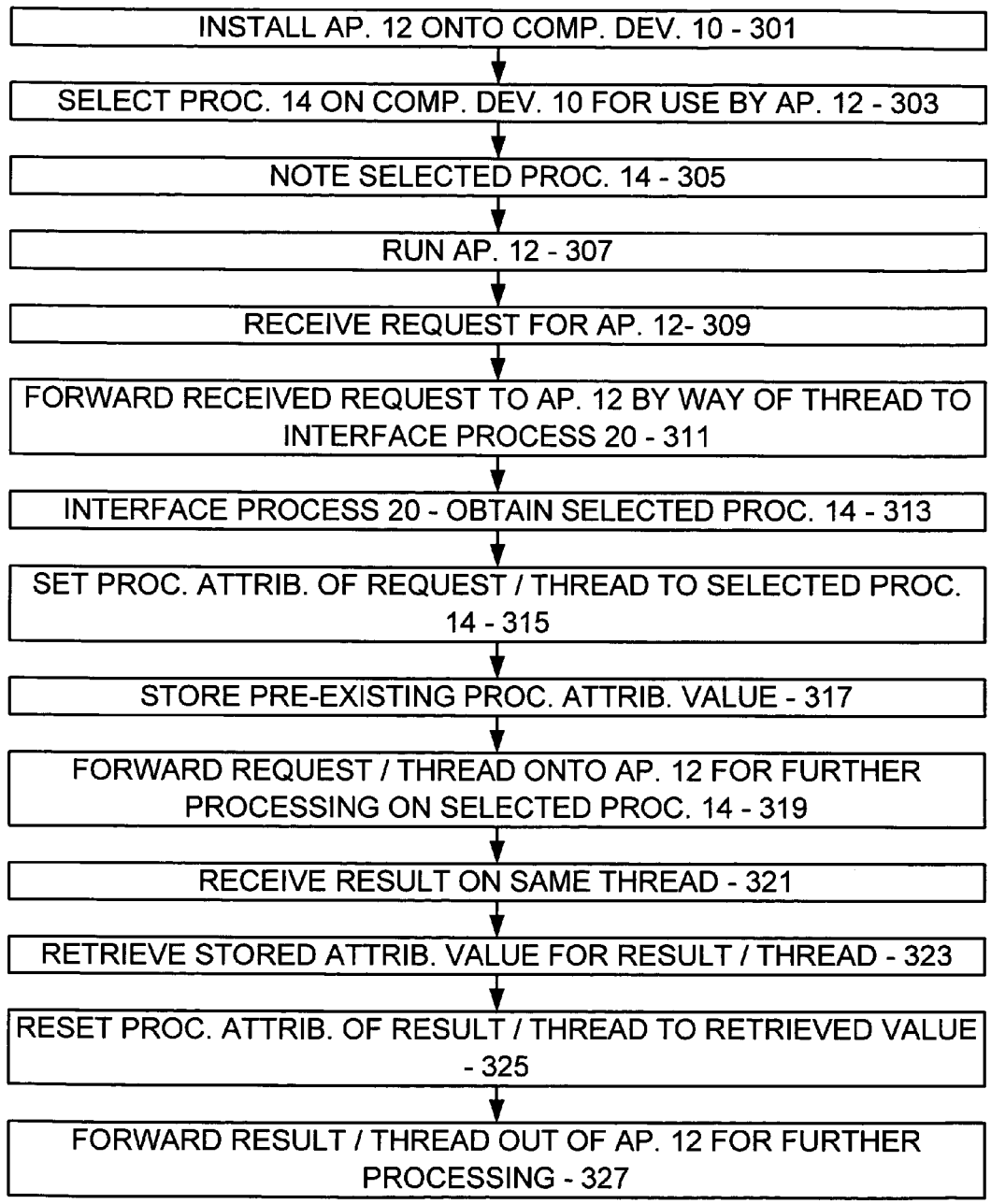
FIG. 3 is a flow diagram showing key steps performed by and in connection with the interface process of FIG. 2 to enforce a thread-based restriction on use the use of the application of FIG. 2 in accordance with one embodiment of the present invention.

Turning now to FIG. 3, it is seen that in one embodiment of the present invention, creating and enforcing a limitation on an application 12, and particularly creating and enforcing a single processor limitation, is performed in the following manner. Preliminarily, it is seen that the application 12 is installed onto the computing device 10 in an appropriate manner (step 301), and that in doing so an installer selects a single one of the one or more processors 14 on the computing device 10 for use by the application 12 as installed thereon (step 303). Note that a default selection of a processor 14 may be provided to the installer, and the installer may choose the default processor 14 or any other processor 14 on the computing device 10, as desired. At any rate, such selected processor 14 is noted in an appropriate memory location of the computing device 10 (step 305), such as for example a registry or other central data repository.

Once installed, the application 12 is then run (step 307), and in the course of running a request for the application 12 is received by the incoming request receiver 18 (step 309) from a requestor and is appropriately forwarded by such incoming request receiver 18 to the application 12. Specifically, the incoming request receiver 18 upon receiving the request for the application 12 forwards the received request to the application 12 by way of a thread thereof that leads to the interface process 20 of the application 12 (step 311).

The interface process 20 obtains the selected processor 14 from the memory location thereof (step 313), either once upon being instantiated or each time a request/thread is received, and upon in fact receiving the request/thread that was sent as at step 311, the interface process 20 sets the processor attribute of the request/thread to the selected processor 14 (step 315), presuming the pre-existing processor attribute of such request/thread so allows, and also stores such pre-existing processor attribute value for later retrieval (step 317). Thereafter, the interface process 20 forwards the request/thread onto the remainder of the application 12 for further processing on the processor 14 set for such request/thread (step 319), including generating a result, and eventually receives the result from the remainder of the application 12 on the same thread (step 321). Thereafter, the interface process 20 retrieves the pre-existing processor attribute value for the result/thread (step 323), resets the processor attribute of the result/thread to the retrieved value (step 325), and forwards the result/thread out of the application 12 for further processing (step 327), including eventual delivery of the result to the requestor.

Significantly, the interface process 20 and the method employed thereby ensure that the thread as processed within the limited application 12 abides by the limitations set forth therefor and in particular has the processor attribute thereof set to the selected processor 14 such that the operating system 16 in fact ensures that such thread executes on such selected processor 14. Moreover, the interface process 20 and the method employed thereby ensure that the same thread is not likewise encumbered by such limitation outside of the limited application 12 and in particular has the processor attribute thereof reset to the pre-existing value.

CONCLUSION

The present invention may be practiced with regard to any appropriate application 12, any appropriate interface process 20 thereof, and any limitation that is to be visited on such application 12. Thus, the present invention is not limited merely to threads but encompasses any form of a process whereby attributes or the like can be attached thereto to restrict the implementation of such process in connection with an application 12. Accordingly, the present invention is likewise not limited merely to setting a processor attribute of a thread to a specific processor 14 to limit such thread to execution on such specific processor 14.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism where a particular use of a computer application 12 is to be restricted on a computing device 10 in a reasonable manner without being unduly harsh. The method and mechanism imposes such restriction by way of restricting a thread executing on the computing device 10 and corresponding to the application 12. Such restriction may be with regard to restricting use of the application 12 to one or more particular processors 14 on the computing device 10, and the method and mechanism allow a distributor/manufacturer of the application 12 to enforce the restriction even on a computing device 10 that otherwise fails to satisfy such restriction.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method for enforcing a limitation of use of system resources on an application operating on a computing device, the computing device including an operating system thereon that manages the application and that maintains a number of threads belonging to the application, each thread having a number of attributes assigned thereto by the operating system, the operating system executing each thread according to each attribute thereof, the method comprising an interface process of the application:

receiving a reference to a thread and a corresponding request for the application from a requestor;

setting an attribute from an original value to a limitation value, wherein the attribute corresponds to the limitation of use of system resources;

forwarding the reference to the thread to the application for further processing in accordance with the limitation to produce a result;

receiving the reference to the thread after the application has further processed the thread;

resetting the attribute of the thread to the original value to remove the limitation outside of the application; and forwarding the reference to the thread for further processing and delivery to the requestor, whereby the interface process ensures by way of setting and resetting the attribute on the thread that the limitation of use of system resources on the application is satisfied.

2. The method of claim 1 wherein the limitation of use of system resources comprises restricting the application to a pre-defined sub-set of processors on the computing device.

3. The method of claim 1 wherein the limitation of use of system resources comprises restricting the application to one of a pre-defined sub-set of ports on the computing device, a pre-defined sub-set of memory devices on the computing device, a pre-defined sub-set of memory addresses on the computing device, a pre-defined sub-set of peripherals on the computing device, and combinations thereof.

4. The method of claim 1 further comprising the interface process ensuring that the limitation does not violate any original limitation in connection with the thread.

5. The method of claim 1 for enforcing a limitation that the application execute on a pre-selected processor of the computing device, the method comprising the interface process of the application:

receiving a reference to a thread and a corresponding request for the application from a requestor;

identifying the pre-selected processor;

setting a processor attribute, which corresponds to the limitation, of the thread that corresponds to the request to the pre-selected processor as set in the processor and thereby replacing the original value of the processor attribute;

forwarding the reference to the thread for further processing by the application on the pre-selected processor as set in the processor attribute of such request thread, the application generating a result;

receiving the reference to the thread after the application has further processed the thread;

resetting the attribute of the thread to the original value; and forwarding the reference to the thread out of the application for further processing and delivery to the requestor.

6. The method of claim 5 comprising the interface process of the application:

storing the replaced original value of the processor attribute value upon setting the processor attribute;

retrieving the original value of the processor attribute value for the thread;

resetting the processor attribute of the thread to the retrieved value.

7. The method of claim 5 farther comprising, during installation of the application on the computing device:

receiving a selection of one of one or more processors on the computing device as the pre-selected processor for use by the application; and storing the identification of the pre-selected processor in a memory location of the computing device.

8. A computing device including a processor and an application and an operating system executing thereon that manages the application and that maintains a number of threads relating to the application, each thread having a number of attributes assigned thereto by the operating system, the operating system executing each thread according to each attribute thereof, the application including an interface process for enforcing a limitation of use of system resources on the application, the interface process of the application:

receiving a reference to a thread and a corresponding request for the application from a requestor;

setting an attribute, from a pre-existing value to a limitation value, wherein the attribute corresponds to the limitation of use of system resources;

forwarding the reference to the thread to the application for further processing in accordance with the limitation to produce a result;

receiving the reference to the thread after the application has further processed the thread;

resetting the attribute of the thread to the pre-existing value to remove the limitation outside of the application; and forwarding the reference to the thread for further processing and delivery to the requestor, whereby the interface process ensures by way of setting and resetting the attribute on the thread that the limitation on the application is satisfied.

9. The computing device of claim 8 wherein the wherein the limitation of use of system resources comprises restricting the application to a pre-defined sub-set of processors on the computing device.

10. The computing device of claim 8 wherein the wherein the limitation of use of system resources comprises restricting the application to one of a pre-defined sub-set of ports on the computing device, a pre-defined sub-set of memory devices on the computing device, a pre-defined sub-set of memory addresses on the computing device, a pre-defined sub-set of peripherals on the computing device, and combinations thereof.

11. The computing device of claim 8 wherein the interface process ensures that the limitation does not violate any pre-existing limitation in connection with the thread.

12. The computing device of claim-8 wherein the interface process enforces a limitation that the application execute on a pre-selected processor of the computing device, the interface process of the application:

receiving a reference to a thread and a corresponding request for the application from a requestor;

identifying the pre-selected processor;

setting a processor attribute, which corresponds to the limitation, of the thread that corresponds to the request to the pre-selected processor and thereby replacing a pre-existing value of the processor attribute;

forwarding the reference to the thread for farther processing by the application on the pre-selected processor as set in the processor attribute of such thread, the application generating a result;

receiving the reference to the thread after the application has flirt her processed the thread;

resetting the processor attribute of the thread to the pre-existing value; and forwarding the reference to the thread out of the application for flirt her processing and delivery of the result to the requestor.

13. The computing device of claim 12 wherein the interface process of the application:

stores the replaced pre-existing value of the processor attribute value upon setting the processor attribute;

retrieves the pre-existing value of the processor attribute value for the reference to the thread; and resets the processor attribute of the reference to the thread to the retrieved value.

14. A computer-readable medium having stored thereon computer-executable instructions implementing a method for enforcing a limitation of use of system resources on an application operating on a computing device, the computing device including an operating system thereon that manages the application and that maintains a number of threads relating to the application, each thread having a number of attributes assigned thereto by the operating system, the operating system executing each thread according to each attribute thereof, the method comprising an interface process of the application:

receiving a reference to a thread and a corresponding request for the application from a requestor;

setting an attribute, from an original value to a limitation value, wherein the attribute corresponds to the limitation of use of system resources;

forwarding the reference to the thread to the application for further processing in accordance with the limitation to produce a result;

receiving the reference to the thread after the application has further processed the thread;

resetting the attribute of the thread to the original value to remove the limitation outside of the application; and forwarding the reference to the thread for farther processing and delivery to the requestor;

whereby the interface process ensures by way of setting and resetting the attribute on the thread that the limitation on the application is satisfied.

15. The medium of claim 14 wherein the limitation of use of system resources comprises restricting the application to a pre-defined sub-set of processors on the computing device.

16. The medium of claim 14 wherein the limitation of use of system resources comprises restricting the application to one of a pre-defined sub-set of ports on the computing device, a pre-defined sub-set of memory devices on the computing device, a pre-defined sub-set of memory addresses on the computing device, a pre-defined sub-set of peripherals on the computing device, and combinations thereof 17. The medium of claim 14 wherein the method further comprises the interface process ensuring that the limitation does not violate any original limitation in connection with the thread.

18. The medium of claim 14 wherein the method enforces a limitation that the application execute on a pre-selected processor of the computing device, the method comprising the interface process of the application:
  receiving a reference to a thread and a corresponding request for the application from a requestor;
  identifying the pre-selected processor;
  setting a processor attribute, which corresponds to the limitation, of the thread that corresponds to the request to the pre-selected processor as set in the processor and thereby replacing the original value of the processor attribute;
  forwarding the reference to the thread for further processing by the application on the pre-selected processor as set in the processor attribute of such request thread, the application generating a result;
  receiving the reference to the thread after the application has further processed the thread;
  resetting the processor attribute of the thread to the original value; and
  forwarding the reference to the thread out of the application for further processing and delivery to the requestor.

19. The medium of claim 18 wherein the method comprises the interface process of the application:
  storing the replaced original value of the processor attribute value upon setting the processor attribute;
  retrieving the original value of the processor attribute value for the thread;
  resetting the processor attribute of the thread to the retrieved value.

20. The medium of claim 18 wherein the method further comprises, during installation of the application on the computing device:
  receiving a selection of one of one or more processors on the computing device as the pre-selected processor for use by the application; and
  storing the identification of the pre-selected processor in a memory location of the computing device.

\* \* \* \* \*